(12) United States Patent
Birkenes

(10) Patent No.: US 10,473,751 B2
(45) Date of Patent: Nov. 12, 2019

(54) AUDIO BASED MOTION DETECTION

(71) Applicant: Cisco Technology, Inc., San Jose, CA (US)

(72) Inventor: Oystein Birkenes, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 341 days.

(21) Appl. No.: 15/496,362

(22) Filed: Apr. 25, 2017

(65) Prior Publication Data

US 2018/0306900 A1   Oct. 25, 2018

(51) Int. Cl.
| | |
|---|---|
| G01S 5/18 | (2006.01) |
| G06F 1/32 | (2019.01) |
| G10L 21/038 | (2013.01) |
| H04N 5/232 | (2006.01) |
| H04N 7/15 | (2006.01) |
| H04R 29/00 | (2006.01) |
| H04R 3/00 | (2006.01) |
| H04R 3/04 | (2006.01) |
| G06F 1/3231 | (2019.01) |
| G06F 1/3296 | (2019.01) |
| H04N 7/14 | (2006.01) |
| G01S 1/74 | (2006.01) |

(52) U.S. Cl.
CPC ........ G01S 5/18 (2013.01); G01S 1/74 (2013.01); G06F 1/3231 (2013.01); G06F 1/3296 (2013.01); H04N 7/147 (2013.01); H04R 3/005 (2013.01); H04R 2430/23 (2013.01)

(58) Field of Classification Search
CPC .. G01S 5/18; G01S 1/74; H04N 7/147; G06F 1/3231; G06F 1/3296; H04R 3/005; H04R 2430/23
See application file for complete search history.

(56) References Cited

U.S. PATENT DOCUMENTS

| | | |
|---|---|---|
| 8,096,937 B2 | 1/2012 | Miller, III |
| 8,180,068 B2 | 5/2012 | Fujii et al. |
| 8,675,883 B2 | 3/2014 | Birkenes |
| 9,319,633 B1 | 4/2016 | Birkenes et al. |
| 9,363,386 B2 | 6/2016 | Li et al. |

(Continued)

OTHER PUBLICATIONS

R. Ricci, et al., "Experimental Validation of an Ultrasound-Based Measurement System for Human Motion Detection and Analysis", 2013 IEEE International Instrumentation and Measurement Technology Conference (I2MTC), May 6-9, 2013, IEEE, DOI: 10.1109/I2MTC.2013.6555428, 6 pages.

(Continued)

*Primary Examiner* — Daniel Pihulic
(74) *Attorney, Agent, or Firm* — Edell, Shapiro & Finnan, LLC

(57) ABSTRACT

A controller of a collaboration endpoint generates a primary audio signal for an ultrasonic source audio signal produced by a source audio speaker, a reference audio signal for the ultrasonic source audio signal, and, based on the reference audio signal, a predicted signal that is predictive of the primary audio signal. The controller produces a prediction error of the predicted signal by comparing the primary audio signal with the predicted signal and determines whether the prediction error is indicative of a motion of one or more persons near the collaboration endpoint.

20 Claims, 12 Drawing Sheets

(56) References Cited

U.S. PATENT DOCUMENTS

| | | |
|---|---|---|
| 9,473,865 B2 | 10/2016 | Thormundsson et al. |
| 10,267,912 B1* | 4/2019 | Birkenes ............... G01S 15/523 |
| 2013/0129102 A1* | 5/2013 | Li ......................... H04M 9/082 |
| | | 381/71.1 |
| 2016/0044394 A1 | 2/2016 | Derom |
| 2016/0192069 A1 | 6/2016 | McIntosh et al. |
| 2018/0306900 A1* | 10/2018 | Birkenes ................... G01S 5/18 |

OTHER PUBLICATIONS

Oystein Birkenes, "A Phase Robust Spectral Magnitude Estimator for Acoustic Echo Suppression", IWAENC 2010, Aug. 2010, 4 pages.

N. Bloom, et al., "Digital Ultrasonic Motion Detector", Sep. 2011, SIPL—Signal & Image Processing Lab: Electrical Engineering Department, Technion, SIPL Archive No. 5-2-09, http://sipl.technion.ac.il/Info/Teaching_Projects_5-2-09_e.shtml, 5 pages.

\* cited by examiner

AUDIO BASED MOTION DETECTION

TECHNICAL FIELD

The present disclosure relates to motion detection based on at least one source audio signal.

BACKGROUND

Collaboration endpoints are generally used for multimedia meetings. These endpoints may include cameras, displays, microphones, speakers, and other equipment configured to facilitate multimedia meetings. Endpoint equipment often remains activated for long periods of time even when the equipment is only used intermittently for multimedia meetings.

DESCRIPTION OF EXAMPLE EMBODIMENTS

Overview

A controller of a collaboration endpoint generates a primary audio signal for an ultrasonic source audio signal produced by a source audio speaker, a reference audio signal for the ultrasonic source audio signal, and, based on the reference audio signal, a predicted signal that is predictive of the primary audio signal. The controller produces a prediction error of the predicted signal by comparing the primary audio signal with the predicted signal and determines whether the prediction error is indicative of a motion of one or more persons near the collaboration endpoint.

Example Embodiments

When endpoint equipment (e.g., cameras, displays, microphones, speakers, etc.) remains activated during periods of nonuse during a multimedia conference session, the equipment wastes electricity and experiences decreases in life expectancy. Therefore, as described in greater detail below, endpoint equipment may enter a standby mode when the conference room in which the endpoint is located is empty. When a user enters the room, the endpoint equipment may detect motion in the room and, in response, activate (enter an active mode from a standby mode) in anticipation of a multimedia meeting.

Figure 1:
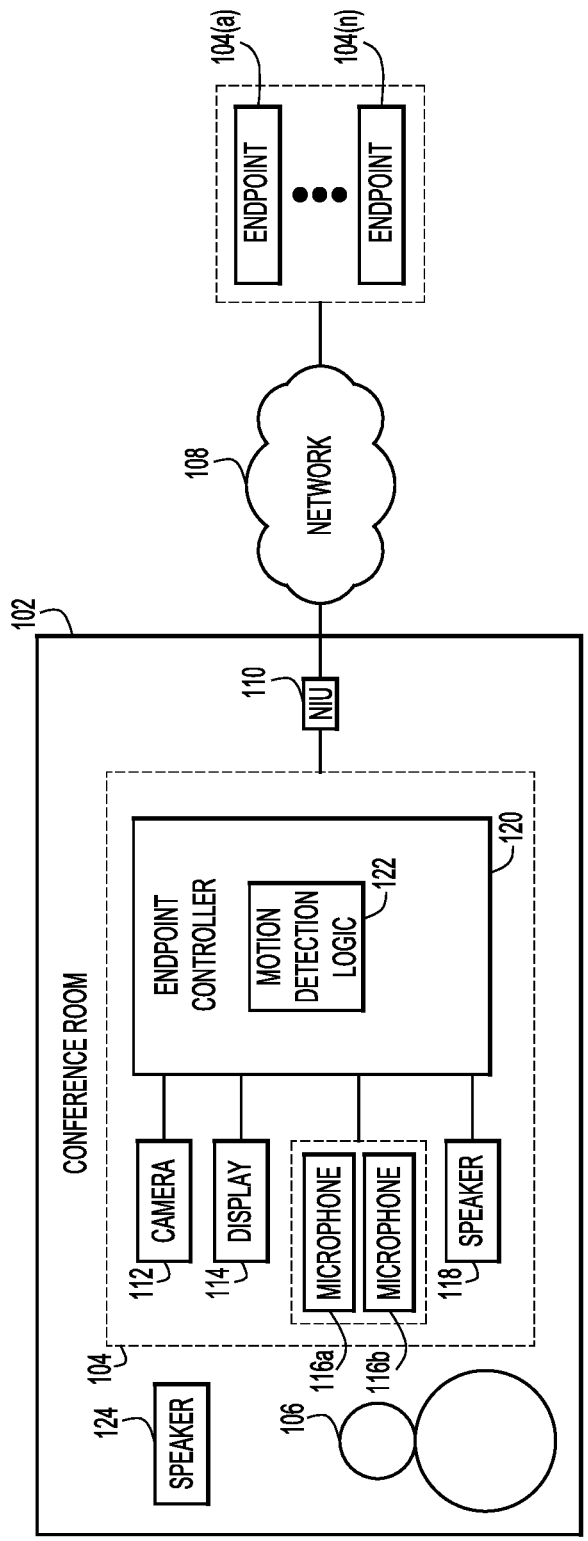
FIG. 1 is a block diagram of a conference room endpoint configured for motion detection, according to an example embodiment.

With reference made to FIG. 1, shown is a block diagram of a conference room 102 that includes an endpoint 104 configured for motion detection in accordance with examples presented herein. The endpoint 104 enables a user 106 to participate in a multimedia conference by communicating with users at other endpoints 104(a)-104(n) via network 108. The network interface unit 110 allows endpoint 102 to connect with network 108. The endpoint 102 is equipped with camera 112, display 114, microphones 116(a) and 116(b), and speaker 118. These components are connected to an endpoint controller 120, which serves as a control unit for the endpoint 104, and executes, among other software instructions, software instructions for motion detection logic 122. The conference room 102 may also include an external speaker 124 that is not connected to the endpoint controller 120.

When user 106 is participating in a multimedia conference, this equipment is active and facilitates user 106 participation in the multimedia conference. Camera 112 and microphones 116(a)/116(b) capture video and audio, respectively, for transmission to one or more of endpoints 104(a)-104(n). Display 114 and speaker 118 output video and audio, respectively, transmitted from one or more of endpoints 104(a)-104(n).

When the multimedia conference ends, the user 106 exits conference room 102. At this point, there are no people in conference room 102, and thus no movement in the conference room 102. In accordance with the motion detection logic 122, the endpoint controller 120 controls the components of the endpoint 104 to enter a standby mode in order to detect motion (e.g., the motion of one or more persons near the endpoint 102). As explained below, when motion is detected (e.g., when one or more persons are near the endpoint 102), the endpoint controller 120 controls the components of the endpoint 104 to activate (enter an active mode from the standby mode) in anticipation of a multimedia meeting.

During standby mode, camera 112 and display 114 may simply shut off/deactivate/power down/etc. However, speakers 118, 124 emit ultrasonic source audio signals. In an example, speaker 124 continuously emits its ultrasonic source audio signal, even when the components of the endpoint 104 are in standby mode, because the speaker 124 is not connected to the endpoint controller 120. Also during standby mode, microphones 116(a)/116(b) continuously sample the ultrasonic source audio signals from speakers 118 and 124.

In this example, the signals produced by microphones 116(a)/116(b) in response to the ultrasonic source audio signals serve as reference audio signals. Meanwhile, the ultrasonic source audio signal produced by speaker 118 is known to the endpoint controller 120 and serves as a primary audio signal. As explained in greater detail below, the endpoint controller executes the motion detection logic 122 to generate, based on the reference audio signals, a predicted signal that is predictive of the primary audio signal. The motion detection logic 122 compares the primary audio signal with the predicted signal to determine whether there is motion of one or more persons near the endpoint 104.

Figure 2:
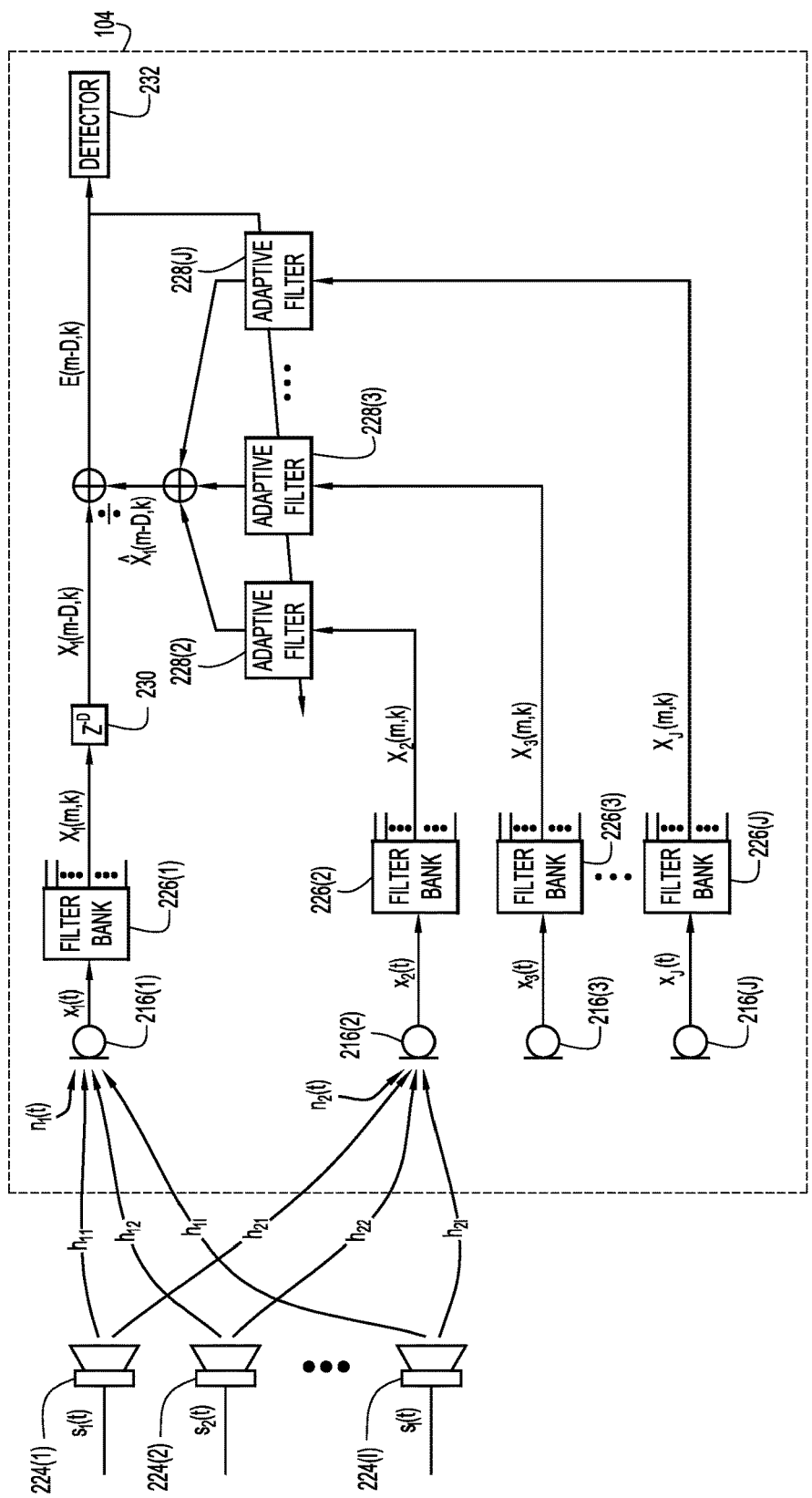
FIG. 2 is a signal processing diagram for motion detection that includes one integrated primary microphone, a plurality of external source audio speakers, and a plurality of integrated reference microphones, according to an example embodiment.
Figure 3:
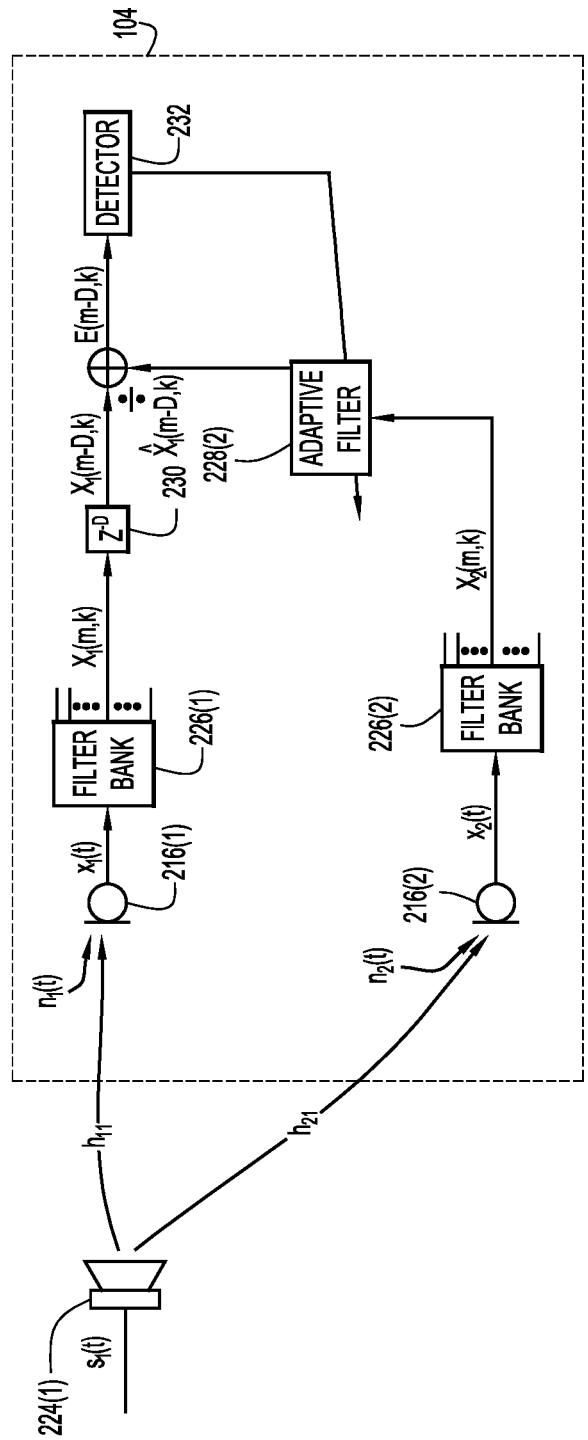
FIG. 3 is a signal processing diagram for motion detection that includes one integrated primary microphone, one external source audio speaker, and one integrated reference microphone, according to an example embodiment.
Figure 4:
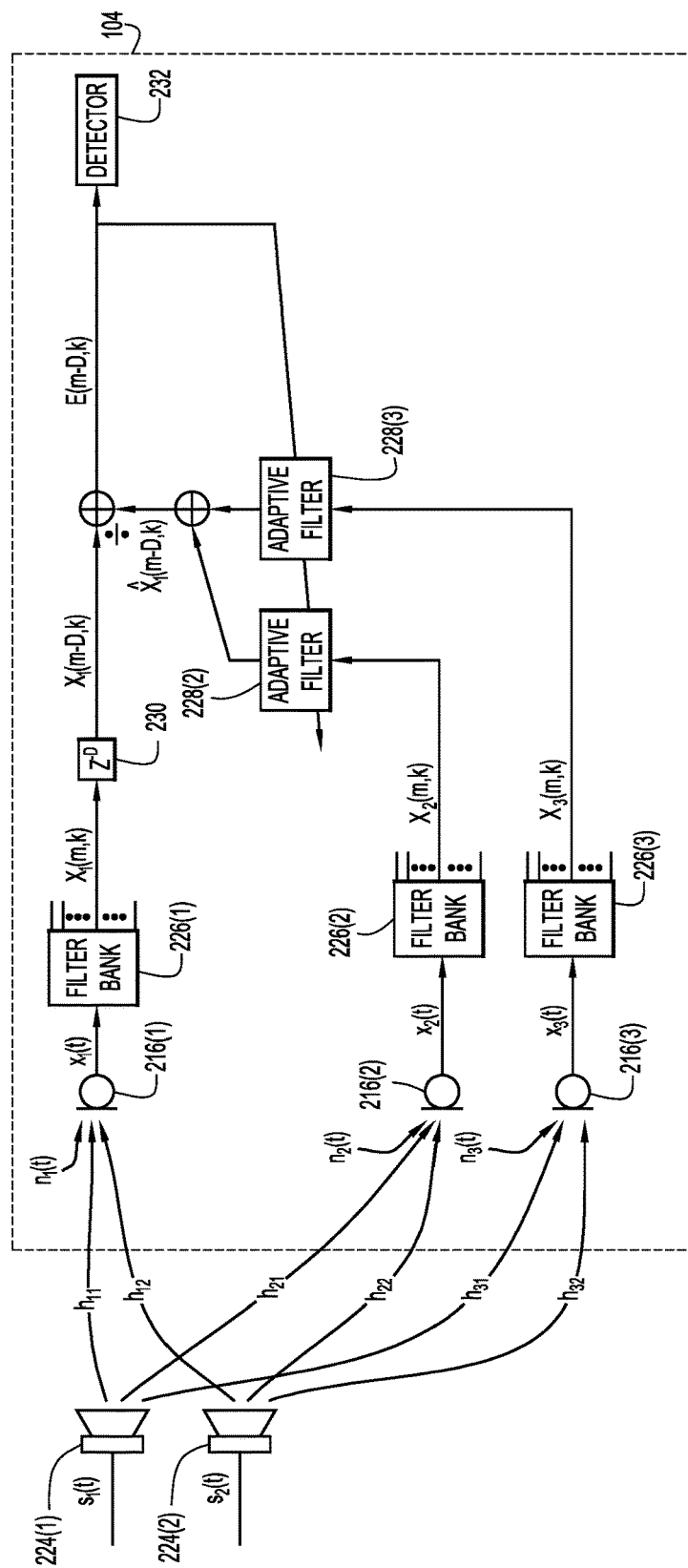
FIG. 4 is a signal processing diagram for motion detection that includes one integrated primary microphone, two external source audio speakers, and two integrated reference microphones, according to an example embodiment.

While in standby mode, the endpoint 104 may operate actively or passively. In active standby mode, the speaker 118 integrated with the endpoint 104 transmits an ultrasonic audio signal into an area/room/location (e.g., conference room). In passive standby mode, the endpoint 104 does not transmit an ultrasonic audio signal. FIGS. 2-4 illustrate example passive mode embodiments and FIGS. 5-10 illustrate example active mode embodiments. In both passive and active standby modes, one or more microphones integrated with the endpoint capture an audio signal from a speaker. The signal processing diagrams of FIGS. 2-10 may be implemented, for example, in a conference room. The endpoint controller 120 performs the signal processing depicted by the signal processing diagrams shown in FIGS. 2-10.

FIG. 2 shows a signal processing diagram for passive standby mode motion detection in accordance with examples presented herein. Speakers 224(1)-(I) are external to an endpoint 104. Endpoint 104 includes microphones 216(1)-(J), filter banks 226(1)-(J) that respectively map to microphones 216(1)-(J), and adaptive filters 228(2)-(J) that respectively map to microphones 216(2)-(J). There is a delay operator 230 and a detector function 232. The detector function 232 generates an output indicative of detected motion.

Speakers 224(1)-(I) produce respective source audio signals $s_1(t), s_2(t), \ldots, s_I(t)$. Source audio signals $s_1(t), s_2(t), \ldots, s_I(t)$ include ultrasonic frequencies (e.g., 20-24 kHz). Each microphone 216(1)-(J) captures the source audio signals $s_1(t), s_2(t), \ldots, s_I(t)$ after the source audio signals have traversed the room and, in response, produces a respective signal $x_1, x_2, x_3, \ldots, x_J$. Each signal $x_1, x_2, x_3, \ldots, x_J$ is a superposition of source audio signals convolved with impulse responses (e.g., $h_{11}$, $h_{12}$, etc.) and a noise signal (e.g., $n_1$, $n_2$, etc.). For purposes of viewability, only the impulse responses and the noise signals corresponding to the microphones 216(1) and 216(2) are shown. Signal $x_1$ may be referred to as a primary audio signal and signals $x_2, x_3, \ldots, x_J$ may be referred to as reference audio signals.

The endpoint 104 detects motion by predicting the delayed time frequency representation of primary signal $x_1$ of microphone 216(1) based on the reference signals $x_2, x_3, \ldots, x_J$ of microphones 216(2)-(J). An endpoint controller of endpoint 104 (not shown) feeds each signal $x_1, x_2, x_3, \ldots, x_J$ through a respective filter bank 226(1)-(J). These filter banks 226(1)-(J) separate the primary audio signal and reference audio signal into sub-bands. For instance, the filter banks 226(1)-(J) respectively partition the signals $x_1, x_2, x_3, \ldots, x_J$ into time-frequency domain signals $X_1(m,k), X_2(m,k), X_3(m,k), \ldots, X_J(m,k)$, where m and k denote a frame index and a frequency bin index, respectively. As explained in greater detail below, the delay operator 230 delays the time-frequency representation of the primary signal, $X_1(m,k)$, by D frames, resulting in the time-frequency domain signal $X_1(m-D, k)$. The endpoint controller of endpoint 104 respectively feeds the time-frequency domain representations of the reference signals, $X_2(m,k), X_3(m,k), \ldots, X_J(m,k)$, through adaptive filters 228(2)-(J), respectively. In an example, the adaptive filters 228(2)-(J) are normalized least mean square filters. The endpoint controller of endpoint 104 sums the contributions of the filtered time-frequency domain representations of the reference signals, $X_2(m,k), X_3(m,k), \ldots, X_J(m,k)$, to generate a predicted signal $\check{X}_1(m-D,k)$ that is predictive of the delayed time-frequency representation of the primary signal $X_1(m-D, k)$. The endpoint controller of endpoint 104 generates prediction error $E(m-D,k)=X_1(m-D,k)-\check{X}_1(m-D,k)$ by comparing the delayed time-frequency representation of the primary audio signal with the predicted signal.

The endpoint controller of endpoint 104 determines whether the prediction error is indicative of the motion of one or more persons near the endpoint 104. The endpoint controller of endpoint 104 updates the adaptive filter coefficients based on the prediction error and sends the prediction error to the detector 232. A relatively large prediction error may indicate motion more strongly than a relatively small prediction error. As discussed above, if the endpoint controller of endpoint 104 determines that there is motion of one or more persons near the collaboration endpoint 104, the endpoint controller of endpoint 104 may activate the components of endpoint 104 in anticipation of a multimedia meeting.

The following is a mathematical derivation of primary signal $x_1$ expressed as a function of the reference signals $x_2, x_3, \ldots, x_J$.

Signal $x_1$ is the superposition of the contributions from the audio signals $s_1(t), s_2(t), \ldots, s_I(t)$ and a noise signal $n_1$. This can be written mathematically as $$x_1(t)=(h_{11}*s_1)(t)+(h_{12}*s_2)(t)+ \ldots +(h_{1I}*s_I)(t)+n_1(t), \quad (1)$$

where * is the convolution operator and $h_{1i}$, $i \in \{1, 2, \ldots I\}$, denotes the impulse response from the ith audio speaker to the first microphone. Signal $x_1$ is a digital signal (i.e., the sampled and quantized version of the analog signal captured at microphone 216(1)), and t denotes the sample index. The variables in (1) are functions of time. Assuming these signals are stationary, (1) may be re-written in the frequency domain as $$X_1(f)=H_{11}(f)S_1(f)+H_{12}(f)S_2(f)+ \ldots +H_{1I}(f)S_I(f)+N_1(f), \quad (2)$$

where upper case variables are used to denote the discrete-time Fourier transform (DTFT) corresponding to the respective lower case variables, with $f \in [0, 1]$ denoting digital frequency. Using vector notation, (2) can be written more compactly as $$X_1(f)=H_1^T(f)S(f)+N_1(f), \quad (3)$$

where $S(f)=[S_1(f), S_2(f), \ldots, S_I(f)]^T$ and $H_1(f)=[H_{11}(f), H_{12}(f), \ldots, H_{1I}(f)]^T$ are I-dimensional vectors. Similar equations can be written for the other microphone signals:

$$X_2(f) = H_2^T(f)S(f) + N_2(f), \quad (4)$$

$$X_3(f) = H_3^T(f)S(f) + N_3(f), \quad (5)$$

$$\vdots$$

$$X_J(f) = H_J^T(f)S(f) + N_J(f), \quad (6)$$

where $H_j(f)=[H_{j1}(f), H_{j2}(f), \ldots, H_{jI}(f)]^T$ for $j \in [2, 3, \ldots, J]$ are I-dimensional vectors. (4)-(6) can be written even more compactly using matrix notation as $$X(f)=H(f)S(f)+N(f), \quad (7)$$

where $X(f)=[X_2(f), X_3(f), \ldots, X_J(f)]^T$ and $N(f)=[N_2(f), N_3(f), \ldots, N_J(f)]^T$ are J–1-dimensional vectors and $$H(f) = \begin{bmatrix} H_{21}(f) & H_{22}(f) & \ldots & H_{2I}(f) \\ H_{31}(f) & H_{32}(f) & & \\ \vdots & & \ddots & \\ H_{J1}(f) & & & H_{JI} \end{bmatrix} \quad (8)$$

is a J–1×I-dimensional matrix. From (7), if the columns of H(f) are linearly independent (this requires that J>1), $$S(f)=(H^T(f)H(f))^{-1}H^T(f)(X(f)-N(f)). \quad (9)$$

Substituting S(f) into (3) yields $$X_1(f) = H_1^T(f)S(f) + N_1(f) \quad (10)$$

$$= H_1^T(f)(H^T(f)H(f))^{-1}H^T(f)(X(f) - N(f)) + N_1(f) \quad (11)$$

$$= \tilde{H}_1^T(f)X(f) + \overline{N}_1(f), \quad (12)$$

where $\tilde{H}_1(f)=H_1^T(f)(H^T(f)H(f))^{-1}H^T(f)=[\tilde{H}_{12}(f), \tilde{H}_{13}(f), \ldots, \tilde{H}_{1J}(f)]^T$ and $\overline{N}_1(f)=N_1(f)-\tilde{H}_1^T(f)N(f)$. Returning to scalar notation yields $$X_1(f)=\tilde{H}_{12}(f)X_2(f)+\tilde{H}_{13}(f)X_3(f)+\ldots+\tilde{H}_{1J}(f)X_J(f)+\overline{N}_1(f), \quad (13)$$

and $$x_1(t)=(\tilde{h}_{12}*x_2)(t)+(\tilde{h}_{13}*x_3)(t)+\ldots+(\tilde{h}_{1J}*x_J)(t)+\tilde{n}_1(t). \quad (14)$$

(14) is a formulation of the signal $x_1$ of microphone 216(1) as a function of the signals $x_2, x_3, \ldots, x_J$ of microphones 216(2)-(J).

However, the impulse responses $\tilde{h}_{12}, \tilde{h}_{13}, \ldots, \tilde{h}_{1J}$ are not causal. For example, in a case involving J=2 microphones and I=1 source, $x_1(t)=(\tilde{h}_{12}*x_2)(t)+\tilde{n}_1(t)$. If the single source is located closer to microphone 1 than to microphone 2, microphone 1 receives the sound before microphone 2 and $\tilde{h}_{12}$ is thus necessarily non-causal. Because it is desired for the impulse responses to be causal, one or more of the impulse responses $\tilde{h}_{12}, \tilde{h}_{13}, \ldots, \tilde{h}_{1J}$ may be delayed by T samples, where T may be equal to at least an amount of time between generating the primary audio signal and generating the reference audio signal. In the example of FIG. 2, the delay of D frames corresponds to at least T samples of delay in the time domain. In the above example involving J=2 microphones and I=1 source, T may be at least as large as the time between microphone 1 receiving the source audio signal and microphone 2 receiving the source audio signal. This implies that the impulse responses will be causal if the T-sample delayed microphone signal $x_1(t-T)$ is predicted from non-delayed microphone signals $x_2(t), \ldots, x_J(t)$. This can be expressed mathematically as:

$$x_1(t-T)=(g_{12}*x_2)(t)+(g_{13}*x_3)(t)+\ldots+(g_{1J}*x_J)(t)+\tilde{n}_1(t-T), \quad (15)$$

where $g_{1j}$, $j \in \{2, 3, \ldots, J\}$, is a T-sample delayed version of $\tilde{h}_{1j}$. When the impulse responses are causal, the T-sample delayed microphone signal $x_1(t-T)$ may be predicted with multichannel adaptive filtering, as shown in (16) below:

$$\hat{x}_1(t-T)=(w_2*x_2)(t)+(w_3*x_3)(t)+\ldots+(w_J*x_J)(t), \quad (16)$$

where $w_2, w_3, \ldots w_J$ denote the J–1 vectors of adaptive filter coefficients. As long as the impulse responses $g_{12}, g_{13}, \ldots, g_{1J}$ are approximately constant and the noise term $\tilde{n}_1(t)$ is approximately stationary and small compared to the reference signal terms in (15), the prediction error is expected to be small. This is typically the case when a person is not in the room. When one or more of the impulse responses changes or the noise term $\tilde{n}_1(t)$ suddenly increases (e.g., due to a person entering the conference room in which the endpoint 104 is located), the prediction error increases. Thus, as shown in (16), the endpoint 104 detects motion by predicting the T-sample delayed primary signal $x_1$ of microphone 216(1) based on the reference signals $x_2, x_3, \ldots, x_J$ of microphones 216(2)-(J).

In an example, the detector 232 detects motion based on an estimate P(m,k) of the mean square error. The detector 232 may use exponential recursive weighting such as $$P(m,k)=\alpha P(m-1,k)+(1-\alpha)|E(m,k)|^2, \quad (17)$$

where $\alpha$ is a forgetting factor in the range [0,1). For example, for some threshold P, $$P(m,k)<P \Rightarrow \text{No motion.} \quad (18)$$

$$P(m,k) \geq P \Rightarrow \text{Motion.} \quad (19)$$

Thus, in this example, the detector detects motion from an increase in P(m,k). If P(m,k) is less than a threshold P, the endpoint controller of endpoint 104 may conclude that there is no motion of one or more persons near the endpoint 104. If the P(m,k) is equal to or greater than the threshold P, the endpoint controller of endpoint 104 may conclude that there is motion of one or more persons near the endpoint 104.

The above derivation involves multichannel adaptive filtering in the digital time domain. Alternatively, the endpoint controller of endpoint 104 may perform multichannel adaptive filtering in the time-frequency domain. Time-frequency domain adaptive filtering is computationally cheaper and provides faster convergence than time domain adaptive filtering. In addition, time-frequency domain adaptive filtering allows the endpoint 104 to predict only the ultrasonic portion of the signal $x_1$ while ignoring other frequencies.

FIGS. 3 and 4 are specific examples of passive standby mode detection. With reference first to FIG. 3, a signal processing diagram is shown for predicting signal $x_1$ based on another signal $x_2$ with one source audio signal $s_1$ in accordance with examples presented herein. Speaker 224(1) is external to endpoint 104 and emits audio signal $s_1$. Endpoint 104 includes microphones 216(1)-(2) (which produce signals $x_1, x_2$), filter banks 226(1)-(2), adaptive filter 228(2), delay operator 230, and detector 232.

In this example, signal $x_1$ is the primary signal and signal $x_2$ is the reference signal. As in FIG. 2, filter banks 226(1)-(2) respectively partition the signals $x_1, x_2$ into time-frequency domain signals $X_1(m,k), X_2(m,k)$. The delay operator 230 delays the time-frequency representation of the primary signal, $X_1(m,k)$, by D frames, resulting in $X_1(m-D, k)$. The endpoint controller of endpoint 104 feeds the time-frequency domain representations of the reference signal, $X_2(m,k)$, through adaptive filter 228(2) and generates a predicted signal $\hat{X}_1(m-D,k)$ that is predictive of the delayed time-frequency representation of the primary signal, $X_1(m-D,k)$. The endpoint controller of endpoint 104 generates prediction error $E(m-D,k)=X_1(m-D,k)-\hat{X}_1(m-D,k)$ by comparing the delayed time-frequency representation of the primary audio signal with the predicted signal, and determines whether the prediction error is indicative of the motion of one or more persons near the collaboration endpoint 104.

The following is a mathematical derivation of the discrete time Fourier transform of the primary signal $X_1(f)$ expressed as a function of the discrete time Fourier transform of the reference signal $X_2(f)$ in the example of FIG. 3. In this case, the matrix at (8) reduces to the scalar $$H(f)=H_{21}(f), \tag{20}$$

the channel vector in (12) reduces to the scalar $$\bar{H}_1(f) = \frac{H_{11}(f)}{H_{21}(f)}, \tag{21}$$

and $$\bar{N}_1(f) = N_1(f) - \frac{H_{11}(f)}{H_{21}(f)}N_2(f). \tag{22}$$

(13) thus simplifies to $$X_1(f) = \frac{H_{11}(f)}{H_{21}(f)}X_2(f) + N_1(f) - \frac{H_{11}(f)}{H_{21}(f)}N_2(f). \tag{23}$$

Thus, filtering $X_2(m,k)$ with linear adaptive filter 228(2) may enable the endpoint controller of endpoint 104 to generate predicted signal $\hat{X}_1(m-D,k)$, and determine whether the prediction error is indicative of the motion of one or more persons near the endpoint 104.

Turning now to FIG. 4, a signal processing diagram is shown for predicting the delayed time-frequency representation of the primary signal $x_1(t)$ from the time-frequency representations of the reference signals $x_2(t)$ and $x_3(t)$ in accordance with examples presented herein. In other words, $X_1(m-D,k)$ is predicted from $X_2(m,k)$ and $X_3(m,k)$. Speakers 224(1)-(2) produce source audio signals $s_1$, $s_2$ and are external to endpoint 104. Endpoint 104 includes microphones 216(1)-(3) (which produce signals $x_1$, $x_2$, $x_3$), filter banks 226(1)-(3), adaptive filters 228(2)-(3), delay operator 230, and detector 232.

In this example, signal $x_1$ is the primary signal and signals $x_2$, $x_3$ are reference signals. As in FIG. 2, filter banks 226(1)-(3) respectively partition the signals $x_1$, $x_2$, $x_3$ into time-frequency domain signals $X_1(m,k)$, $X_2(m,k)$, $X_3(m,k)$. The delay operator 230 delays the time-frequency representation of the primary signal, $X_1(m,k)$, by D frames, resulting in $X_1(m-D, k)$. The endpoint controller of endpoint 104 respectively feeds the time-frequency domain representations of the reference signals, $X_2(m,k)$, $X_3(m,k)$, through adaptive filters 228(2)-(3) and generates a predicted signal $\hat{X}_1(m-D,k)$ that is predictive of the delayed time-frequency representation of the primary signal, $X_1(m-D, k)$. The endpoint controller of endpoint 104 generates prediction error $E(m-D,k)=X_1(m-D,k)-\hat{X}_1(m-D,k)$ by comparing the delayed time-frequency representation of the primary audio signal with the predicted signal, and determines whether the prediction error is indicative of the motion of one or more persons near the endpoint 104.

The following is a mathematical derivation of the discrete-time Fourier transform of the primary signal, $X_1(f)$, expressed as a function of the discrete-time Fourier transform of the reference signals, $X_2(f)$, $X_3(f)$, in the example of FIG. 4. In this case, the matrix at (8) reduces to $$H(f) = \begin{bmatrix} H_{21}(f) & H_{22}(f) \\ H_{31}(f) & H_{32}(f) \end{bmatrix}. \tag{24}$$

This matrix has linearly independent columns, which means (13) can be re-written as $$X_1(f) = \tilde{H}_{12}(f)X_2(f) + \tilde{H}_{13}(f)X_3(f) + \tilde{N}_1(f). \tag{25}$$

Thus, respectively filtering $X_2(m,k)$, $X_3(m,k)$ with linear adaptive filters 228(2)-(3) may enable the endpoint controller of endpoint 104 to generate predicted signal $\hat{X}_1(m-D,k)$, and determine whether the prediction error is indicative of the motion of one or more persons near the endpoint 104.

Figure 5:
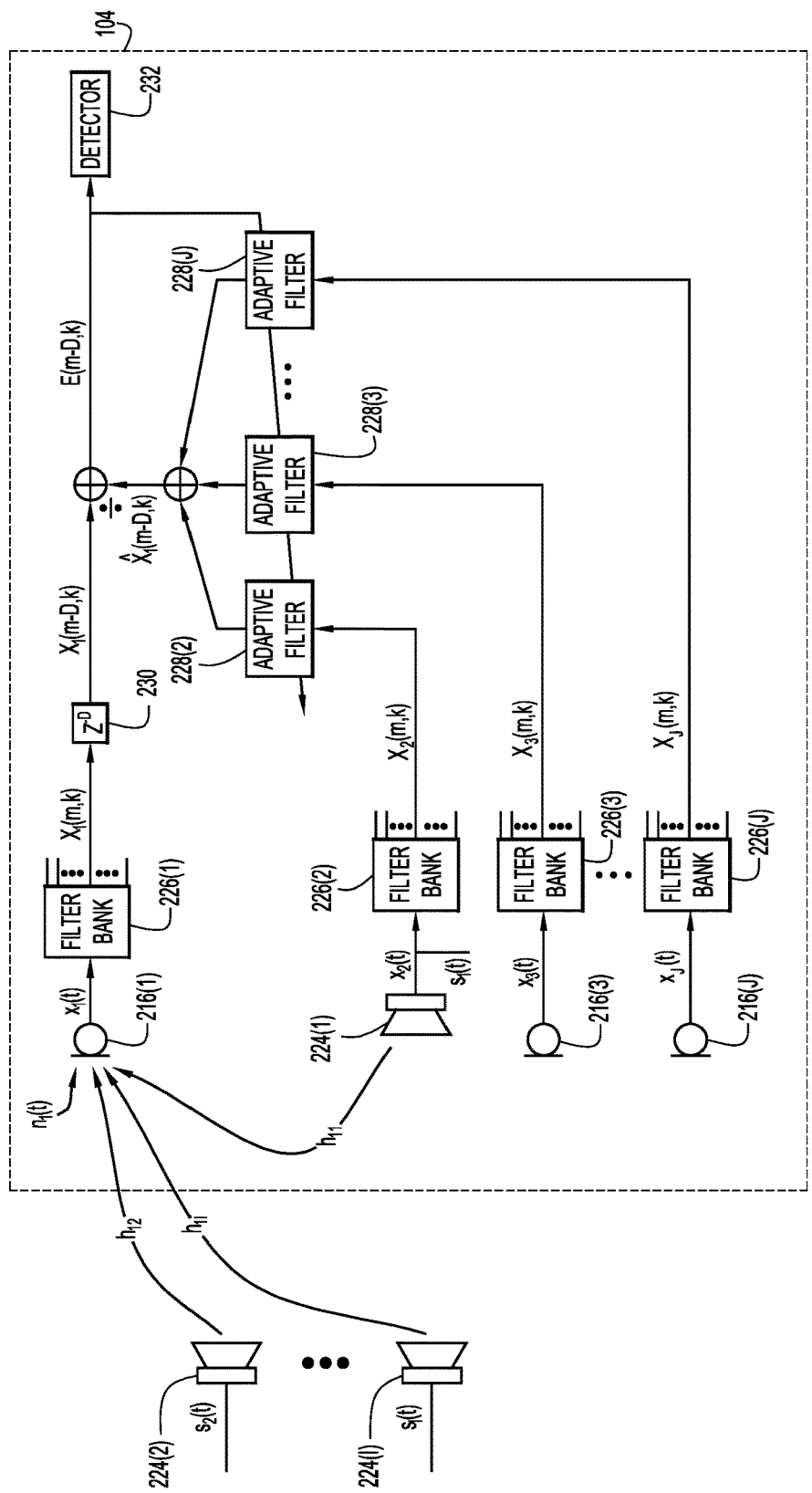
FIG. 5 is a signal processing diagram for motion detection that includes one integrated primary microphone, a plurality of external source audio speakers, one integrated source audio speaker, and a plurality of integrated reference microphones, according to an example embodiment.
Figure 6:
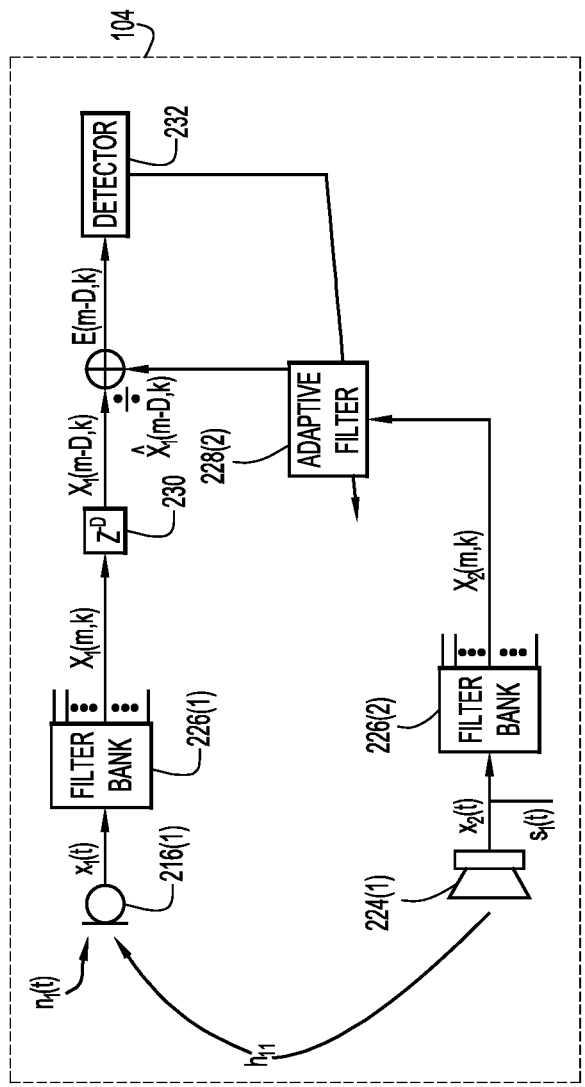
FIG. 6 is a signal processing diagram for motion detection that includes one integrated primary microphone and one integrated source audio speaker, according to an example embodiment.
Figure 7:
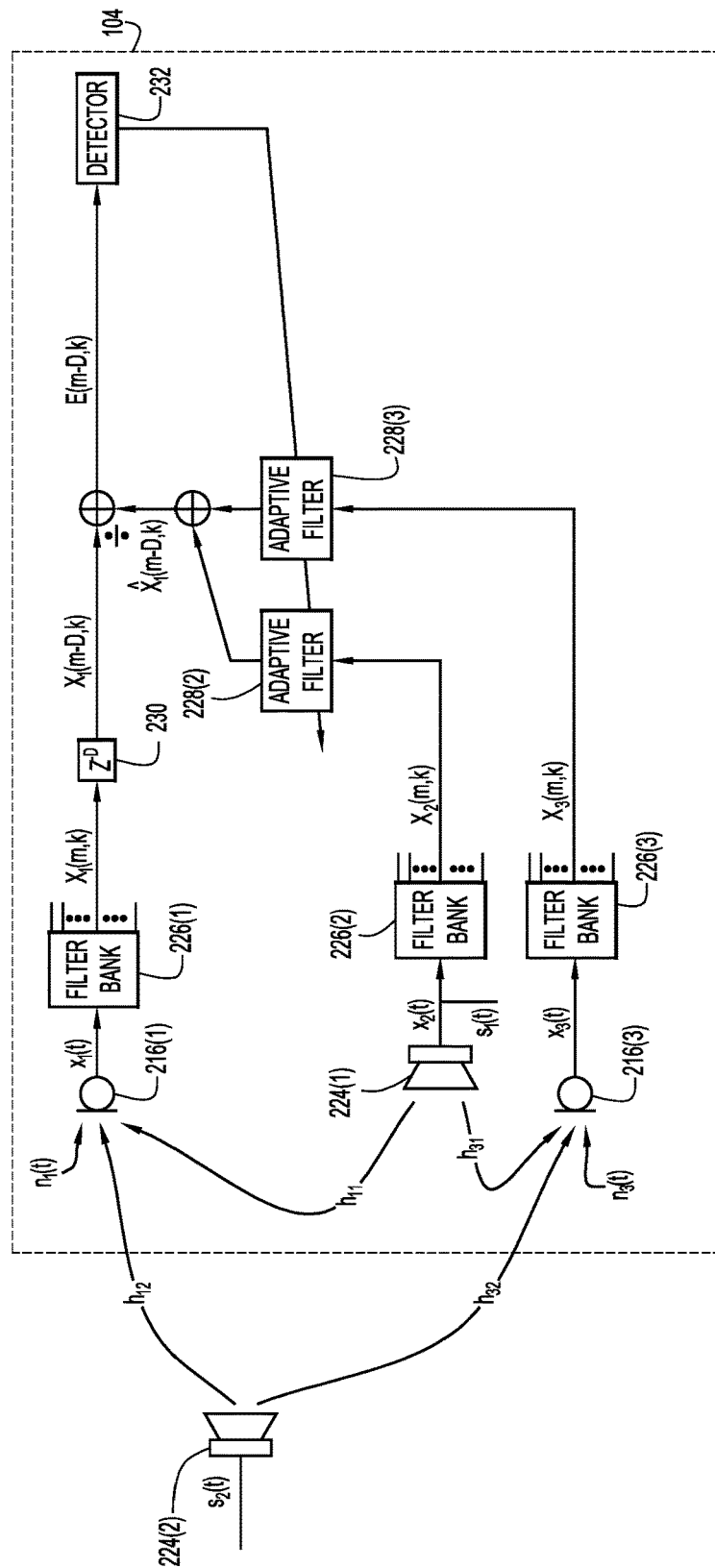
FIG. 7 is a signal processing diagram for motion detection that includes one integrated primary microphone, one external source audio speaker, one integrated source audio speaker, and one integrated reference microphone, according to an example embodiment.
Figure 8:
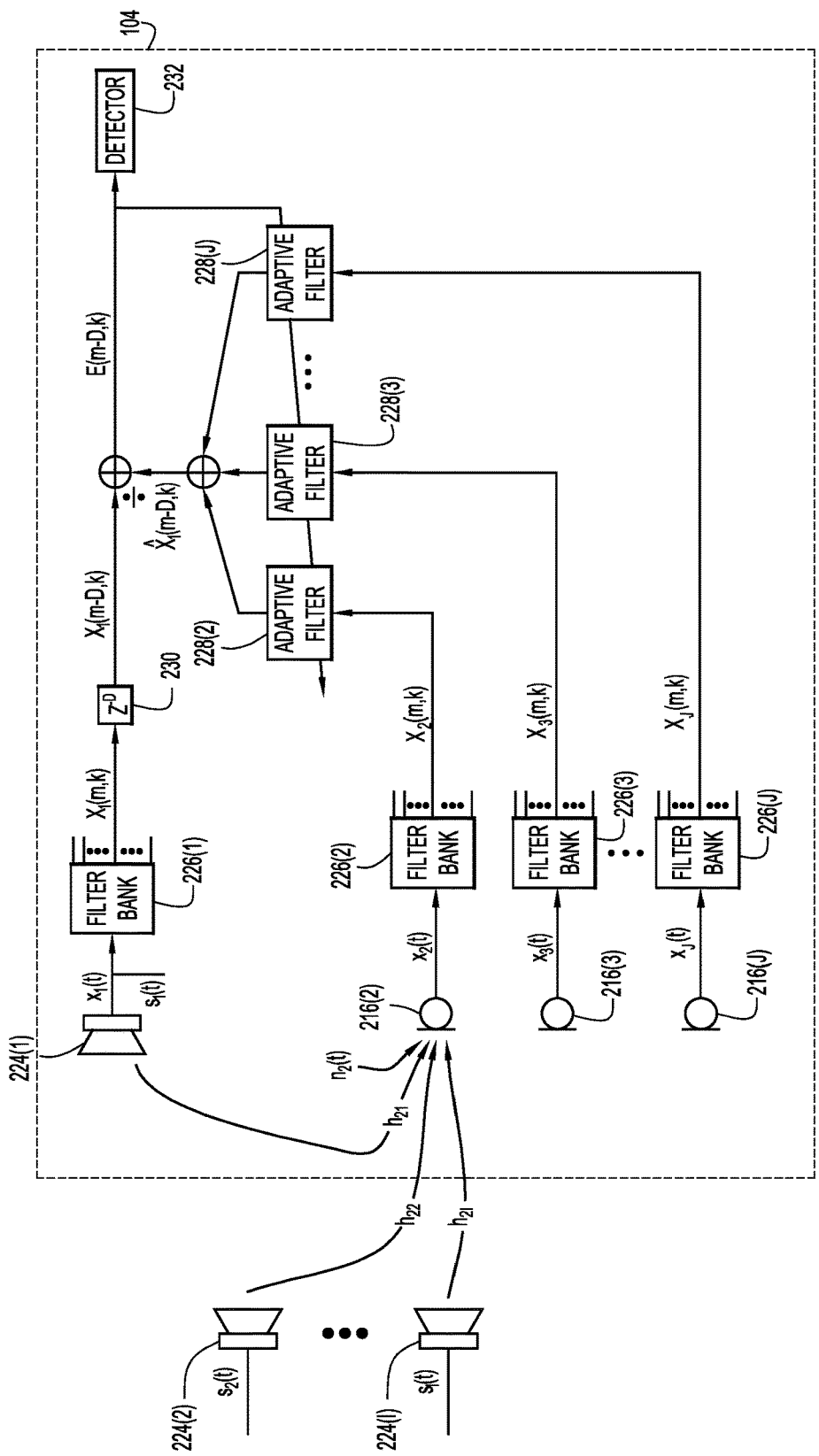
FIG. 8 is a signal processing diagram for motion detection that includes one integrated primary source audio speaker, a plurality of external audio speakers, and a plurality of integrated reference microphones, according to an example embodiment.
Figure 9:
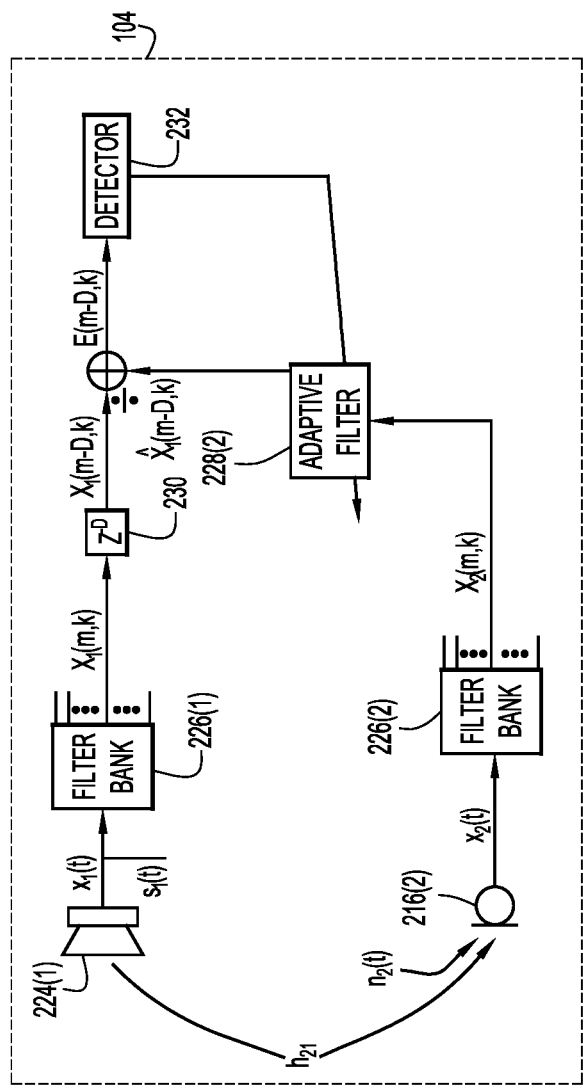
FIG. 9 is a signal processing diagram for motion detection that includes one integrated primary source audio speaker and one integrated reference microphone, according to an example embodiment.
Figure 10:
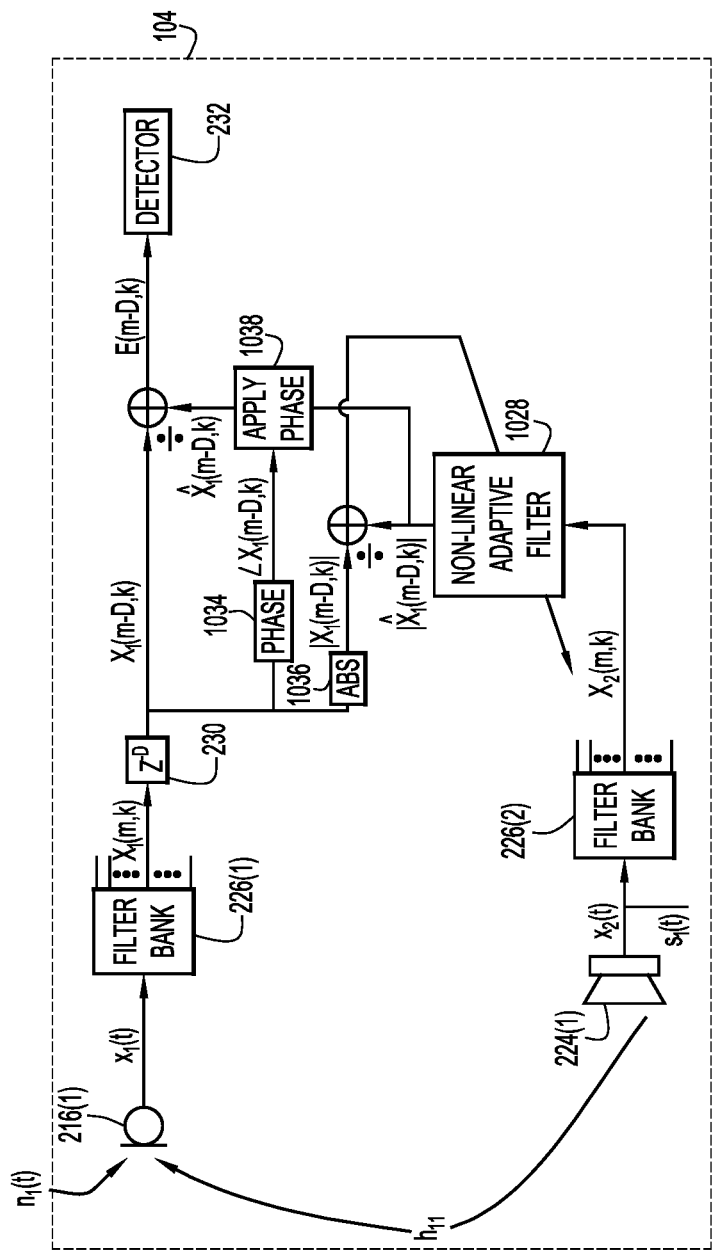
FIG. 10 is signal processing diagram for nonlinear motion detection that includes one integrated primary microphone and one integrated source audio speaker, according to an example embodiment.

As mentioned above, FIGS. 5-10 illustrate example signal processing diagrams for active standby mode, in which the endpoint itself produces at least one source ultrasonic signal to be used for motion detection. FIGS. 5-7 illustrate a first category of active standby mode embodiments in which an integrated speaker serves as a reference audio device. FIGS. 8-9 illustrate a second category of active standby mode embodiments in which an integrated speaker serves as a primary audio device. FIG. 10 illustrates an example involving non-linear adaptive filtering according to the first category of active standby mode embodiments.

With reference first to FIG. 5, a generalized signal processing diagram is shown for predicting the delayed time-frequency representation of the primary signal $x_1(t)$ from the time-frequency representations of the reference audio signals $x_2(t)$, $x_3(t)$, ..., $x_J(t)$ in accordance with examples presented herein. In other words, $X_1(m-D,k)$ is predicted from $X_2(m,k)$, $X_3(m,k)$, ..., $X_J(m,k)$. Speakers 224(2)-(I) are external to endpoint 104, which includes microphone 216(1), speaker 224(1), and microphones 216(3)-(J). Endpoint 104 also includes filter banks 226(1)-(J), adaptive filters 228(2)-(J), delay operator 230, and detector 232.

In this example, signal $x_1$ is the primary signal and signals $x_2$–$x_J$ are reference audio signals. Speakers 224(1)-(I) produce respective source audio signals $s_1(t)$, $s_2(t)$, ..., $s_I(t)$. Each microphone 216(1), 216(3)-(J) captures the source audio signals $s_1(t)$, $s_2(t)$, ..., $s_I(t)$ after the source audio signals have traversed the room and, in response, produces a respective signal $x_1$, $x_3$, ..., $x_J$. In addition, endpoint controller generates reference signal $x_2$ for source audio signal $s_1$ since the speaker 224(1) is integrated into the endpoint 104 and, as such, the endpoint controller of endpoint 104 knows the source audio signal $s_1$. In other words, the speaker 224(1) serves as both a source audio device and a reference audio device. Each signal $x_1$, $x_3$, ..., $x_J$ is a superposition of source audio signals convolved with impulse responses (e.g., $h_{11}$, $h_{12}$, etc.) and a noise signal (e.g., $n_1$, etc.). For purposes of viewability, only the impulse responses and noise signal corresponding to the primary microphone 216(1) are shown.

The endpoint 104 detects motion by predicting the delayed time-frequency representation of the primary signal $x_1$ of microphone 216(1) based on the time-frequency representations of the reference signals $x_2$, $x_3$, ..., $x_J$. In other words, $X_1(m-D,k)$ is predicted from $X_2(m,k)$, $X_3(m,k), \ldots, X_J(m,k)$. An endpoint controller of endpoint 104 feeds each of the audio signals $x_1, x_2, x_3, \ldots, x_J$ through a respective filter bank 226(1)-(J). These filter banks 226(1)-(J) respectively partition the audio signals $x_1, x_2, x_3, \ldots, x_J$ into time-frequency domain signals $X_1(m,k), X_2(m,k), X_3(m,k), \ldots, X_J(m,k)$, where m and k denote a frame index and a frequency bin index, respectively. The delay operator 230 delays the time-frequency representation of the primary signal, $X_1(m,k)$, by D frames, resulting in $X_1(m-D, k)$. The endpoint controller of endpoint 104 respectively feeds the time-frequency domain representations of the reference audio signals, $X_2(m,k), X_3(m,k), \ldots, X_J(m,k)$, through adaptive filters 228(2)-(J). The endpoint controller of endpoint 104 sums the contributions of the filtered time-frequency domain representations of the reference audio signals to generate a predicted signal $\hat{X}_1(m-D,k)$ that is predictive of the delayed time-frequency representation of the primary signal, $X_1(m-D, k)$. The endpoint controller of endpoint 104 generates prediction error $E(m-D,k)=X_1(m-D,k)-\hat{X}_1(m-D,k)$ by comparing the delayed time-frequency representation of the primary audio signal with the predicted signal. As mentioned above, the endpoint controller of endpoint 104 determines whether the prediction error is indicative of the motion of one or more persons near the endpoint 104 and, if the endpoint controller determines that there is motion of one or more persons near the collaboration endpoint 104, the endpoint controller of endpoint 104 may activate endpoint components in anticipation of a multimedia meeting.

Much of the mathematical framework for passive mode motion detection described above applies to active mode motion detection. This is because the active mode can be viewed as a special case of passive mode in which one of the source audio speakers has been moved very close to one of the microphones, such that the relative contributions from the other source audio signals and any noise are so small that they can be neglected. As such, in the example of FIG. 5, $H_2(f)=[H_{21}(f), H_{22}(f), \ldots, H_{2J}(f)]^T=[1, 0, \ldots 0]^T$. In other words, while in reality $x_2$ is a reference audio signal that is generated by the endpoint controller of an endpoint and corresponds to source audio signal $s_1$, conceptually $x_2$ may be considered a fictitious microphone signal equal to the source audio signal $s_1$, with no contributions from $s_1$–$s_J$. In addition, there is no noise added to $x_2$ (i.e., $n_2=0$) because $x_2$ is a loudspeaker signal known to endpoint 104 and not a microphone signal. Thus, the first row of $H(f)$ is the unit vector $H_2(f)$, so that (8) becomes $$H(f) = \begin{bmatrix} 1 & 0 & \cdots & 0 \\ H_{31}(f) & H_{32}(f) & & \\ \vdots & & \ddots & \\ H_{J1}(f) & & & H_{JI} \end{bmatrix}, \quad (26)$$

and, since $N_2(f)=0$, $$N(f)=[0 N_3(f) \ldots N_J(f)]^T. \quad (27)$$

FIG. 6 is an example of the first category of active standby mode motion detection in which an endpoint controller uses a reference audio signal from a source audio speaker to predict the delayed time-frequency representation of a primary audio signal. As shown, endpoint 104 includes microphone 216(1), speaker 224(1), filter banks 226(1)-(2), adaptive filter 228(2), delay operator 230, and detector function 232. There are no external speakers in this example.

In this example, microphone signal $x_1$ is the primary audio signal and loudspeaker signal $x_2$ is the reference audio signal. As in FIG. 5, filter banks 226(1)-(2) respectively partition the audio signals $x_1, x_2$ into time-frequency domain signals $X_1(m,k), X_2(m,k)$. The delay operator 230 delays the time-frequency representation of the primary signal, $X_1(m, k)$, by D frames, resulting in $X_1(m-D, k)$. The endpoint controller feeds the time-frequency domain representations of the reference signal, $X_2(m,k)$, through adaptive filter 228(2) and generates a predicted signal $\hat{X}_1(m-D,k)$ that is predictive of the delayed time-frequency representation of the primary signal, $X_1(m-D, k)$. The endpoint controller generates prediction error $E(m-D,k)=X_1(m-D,k)-\hat{X}_1(m-D,k)$ by comparing the delayed time-frequency representation of the primary audio signal with the predicted signal, and determines whether the prediction error is indicative of the motion of one or more persons near the endpoint 104.

In this case, the matrix in (8) reduces to the scalar $$H(f)=1, \quad (28)$$

the channel vector in (12) reduces to the scalar $$\tilde{H}_1(f)=H_{11}(f), \quad (29)$$

and $$\tilde{N}_1(f)=N_1(f). \quad (30)$$

(13) thus simplifies to $$X_1(f)=H_{11}(f)S_1(f)+N_1(f). \quad (31)$$

Hence, the endpoint controller of the endpoint 104 may generate the predicted signal $\hat{X}_1(m-D,k)$ by filtering $X_2(m,k)$ through adaptive filter 228(2).

FIG. 7 is another example of the first category of active standby mode motion detection. In this example, the endpoint controller of the endpoint 104 predicts a delayed time-frequency representation of a primary audio signal from a reference audio signal from a source audio speaker, and a microphone signal. Endpoint 104 includes microphone 216(1), speaker 224(1), microphone 216(3), filter banks 226(1)-(3), adaptive filters 228(2)-(3), delay operator 230, and detector 232. Speaker 224(2) is external to the endpoint.

In this example, microphone signal $x_1$ is the primary audio signal and audio signals $x_2, x_3$ are reference audio signals. As in FIG. 5, filter banks 226(1)-(3) respectively partition the audio signals $x_1, x_2, x_3$ into time-frequency domain signals $X_1(m,k), X_2(m,k), X_3(m,k)$. The delay operator 230 delays the time-frequency representation of the primary signal, $X_1(m,k)$, by D frames, resulting in $X_1(m-D, k)$. The endpoint controller of the endpoint 104 respectively feeds the time-frequency domain representations of the reference audio signals, $X_2(m,k), X_3(m,k)$, through adaptive filters 228(2)-(3) and generates a predicted signal $\hat{X}_1(m-D,k)$ that is predictive of the delayed time-frequency representation of the primary signal, $X_1(m-D, k)$. The endpoint controller generates prediction error $E(m-D,k)=X_1(m-D,k)-\hat{X}_1(m-D,k)$ by comparing the delayed time-frequency representation of the primary audio signal with the predicted signal, and determines whether the prediction error is indicative of the motion of one or more persons near the endpoint 104.

Mathematically, the matrix in (8) reduces to $$H(f) = \begin{bmatrix} 1 & 0 \\ H_{31}(f) & H_{32}(f) \end{bmatrix}. \quad (32)$$

This matrix has linearly independent columns in general, which means that (13) can be rewritten as $$X_1(f)=\tilde{H}_{12}(f)X_2(f)+\tilde{H}_{13}(f)X_3(f)+\hat{N}_1(f), \quad (33)$$

where $\hat{H}_{12}(f)$ and $\hat{H}'_{12}(f)$ are functions of $H_{11}(f)$, $H_{12}(f)$, $H_{31}(f)$, and $H_{32}(f)$ The noise $\tilde{N}_1(f)=N_1(f)-\hat{H}_{12}(f)N_3(f)$. Hence, the endpoint controller of the endpoint 104 may generate the predicted signal $\hat{X}_1(m-D,k)$ by filtering $X_2(m,k)$, $X_3(m,k)$ through adaptive filters 228(2)-(3).

As mentioned above, FIGS. 8-9 illustrate a second category of active standby mode embodiments in which an integrated speaker serves as a primary audio device. Turning first to FIG. 8, a generalized signal processing diagram is shown for predicting the delayed time-frequency representation of a primary audio signal $x_1$ from a plurality of microphone signals $x_2 \ldots x_J$ in accordance with examples presented herein. Speakers 224(2)-(I) are external to endpoint 104, which includes speaker 224(1), and microphones 216(2)-(J). Endpoint 104 also includes filter banks 226(1)-(J), adaptive filters 228(2)-(J), delay operator 230, and detector function 232.

In this example, audio signal $x_1$ is the primary audio signal and microphone signals $x_2$-$x_J$ are reference audio signals. Speakers 224(1)-(I) produce respective source audio signals $s_1(t), s_2(t), \ldots, s_I(t)$. Each microphone 216(1)-(J) captures the source audio signals $s_1(t), s_2(t), \ldots, s_I(t)$ after the source audio signals have traversed the room and, in response, produces a respective signal $x_1, x_3, \ldots, x_J$. In addition, the endpoint controller of the endpoint generates primary audio signal $x_1$ for source audio signal $s_1$ since the speaker 224(1) is integrated into the endpoint 104 and, as such, the endpoint controller knows the source audio signal $s_1$. In other words, the speaker 224(1) serves as both an audio device and a primary audio device. Each signal $x_2$, $x_3, \ldots, x_J$ is a superposition of source audio signals convolved with impulse responses (e.g., $h_{21}$, $h_{22}$, etc.) and a noise signal (e.g., $n_2$, etc.). For purposes of viewability, only the contributions and noise signal corresponding to the primary microphone 216(2) are shown.

The endpoint 104 detects motion by predicting the delayed time-frequency representation of the primary signal $x_1(t)$ from the time-frequency representations of the reference signals $x_2(t), x_3(t), \ldots, x_J(t)$. In other words, $X_1(m-D,k)$ is predicted from $X_2(m,k), X_3(m,k), \ldots, X_J(m,k)$. The endpoint controller of the endpoint 104 feeds each audio signal $x_1, x_2, x_3, \ldots, x_J$ through a respective filter bank 226(1)-(J). These filter banks 226(1)-(J) respectively partition the audio signals $x_1, x_2, x_3, \ldots, x_J$ into time-frequency domain signals $X_1(m,k), X_2(m,k), X_3(m,k), \ldots, X_J(m,k)$ where m and k denote a frame index and a frequency bin index, respectively. The delay operator 230 delays the time-frequency representation of the primary signal, $X_1(m,k)$, by D frames, resulting in $X_1(m-D, k)$. The endpoint controller of the endpoint 104 respectively feeds the time-frequency domain representations of the reference audio signals, $X_2(m,k), X_3(m,k), \ldots, X_J(m,k)$, through adaptive filters 228(2)-(J). The endpoint controller sums the contributions of the filtered time-frequency domain representations of the reference audio signals to generate a predicted signal $\hat{X}_1(m-D,k)$ that is predictive of the delayed time-frequency representation of the primary signal $X_1(m-D, k)$. The endpoint controller generates prediction error $E(m-D,k)=X_1(m-D,k)-\hat{X}_1(m-D,k)$ by comparing the delayed time-frequency representation of the primary audio signal with the predicted signal. As mentioned above, the endpoint controller determines whether the prediction error is indicative of the motion of one or more persons near the collaboration endpoint 104 and, if the endpoint controller determines that there is motion of one or more persons near the endpoint 104, the endpoint controller may activate endpoint components in anticipation of a multimedia meeting.

Like in the example of FIG. 5, much of the mathematical framework for passive mode motion detection described above applies here to active mode motion detection. In this case, $H_1(f)=[H_{11}(f), H_{12}(f), \ldots, H_{1J}(f)]^T=[1, 0, \ldots 0]^T$ and $N_1(f)=0$.

FIG. 9 is an example of the second category of active standby mode motion detection in which an endpoint controller of the endpoint uses a reference signal from a microphone to predict the delayed time-frequency representation of a primary audio signal. As shown, endpoint 104 includes speaker 224(1), microphone 216(1), filter banks 226(1)-(2), adaptive filter 228(2), delay operator 230, and detector 232. There are no external speakers in this example.

In this example, audio signal $x_1$ is the primary audio signal and audio signal $x_2$ is the reference audio signal. As in FIG. 8, filter banks 226(1)-(2) respectively partition the audio signals $x_1$, $x_2$ into time-frequency domain signals $X_1(m,k)$, $X_2(m,k)$. The delay operator 230 delays the time-frequency representation of the primary audio signal, $X_1(m,k)$, by D frames, resulting in $X_1(m-D, k)$. The endpoint controller of the endpoint 104 feeds the time-frequency domain representation of the reference signal, $X_2(m,k)$, through adaptive filter 228(2) and generates a predicted signal $\hat{X}_1(m-D,k)$ that is predictive of the delayed time-frequency representation of the primary signal, $X_1(m-D, k)$. The endpoint controller generates prediction error $E(m-D,k)=X_1(m-D,k)-\hat{X}_1(m-D,k)$ by comparing the delayed time-frequency representation of the primary audio signal with the predicted signal, and determines whether the prediction error is indicative of the motion of one or more persons near the endpoint 104.

In this case the matrix in (8) reduces to the scalar $$H(f)=H_{21}(f), \quad (34)$$

the channel vector in (12) reduces to the scalar $$\overline{H}_1(f) = \frac{1}{H_{21}(f)}, \quad (35)$$

and $$\overline{N}_1(f) = -\frac{1}{H_{21}(f)}N_2(f). \quad (36)$$

(13) then simplifies to $$X_1(f) = \frac{1}{H_{21}(f)}X_2(f) - \frac{1}{H_{21}(f)}N_2(f). \quad (37)$$

Hence, the endpoint controller of the endpoint 104 may generate the predicted signal $\hat{X}_1(m-D,k)$ by filtering $X_2(m,k)$ through adaptive filter 228(2).

FIGS. 2-9 provide examples of linear prediction (i.e., a model that is linear in its prediction parameters but not necessarily its regressors, which are in this case the time-frequency representations of the reference audio signals). However, in certain situations non-linear prediction may be desirable. For example, the impulse responses in active mode may not always be sufficiently linear and time-invariant (e.g., when a third party amplifier card is used, when a codec is playing the audio source signal through a television with a poorly designed amplifier/speaker, etc.). As such, FIG. 10 provides an example signal diagram of active motion detection using non-linear prediction.

More specifically, FIG. 10 is an example signal diagram in which an endpoint controller of an endpoint uses a reference audio signal from a source audio speaker to predict the delayed time-frequency representation of a primary audio signal. As shown, endpoint 104 includes microphone 216(1), speaker 224(1), filter banks 226(1)-(2), non-linear adaptive filter 1028(2), delay operator 230, and detector 232. Endpoint 104 further includes a phase operator 1034, absolute value operator 1036, and a phase application operator 1038. There are no external speakers in this example.

In this example, the microphone signal $x_1$ is the primary audio signal and audio signal $x_2$ is the reference audio signal. As in FIG. 5, filter banks 226(1)-(2) respectively partition the audio signals $x_1$, $x_2$ into time-frequency domain signals $X_1(m,k)$, $X_2(m,k)$. The delay operator 230 delays the time-frequency representation of the primary signal, $X_1(m,k)$, by D frames, resulting in $X_1(m-D, k)$. The endpoint controller of the endpoint 104 feeds the time-frequency domain representations of the reference signal, $X_2(m,k)$, through adaptive filter 228(2) and generates a predicted signal $\hat{X}_1(m-D,k)$ that is predictive of the delayed time-frequency representation of the primary signal, $X_1(m-D, k)$. The endpoint controller generates prediction error $E(m-D,k)=X_1(m-D,k)-\hat{X}_1(m-D,k)$ by comparing the delayed time-frequency representation of the primary audio signal with the predicted signal, and determines whether the prediction error is indicative of the motion of one or more persons near the collaboration endpoint 104.

Figure 11:
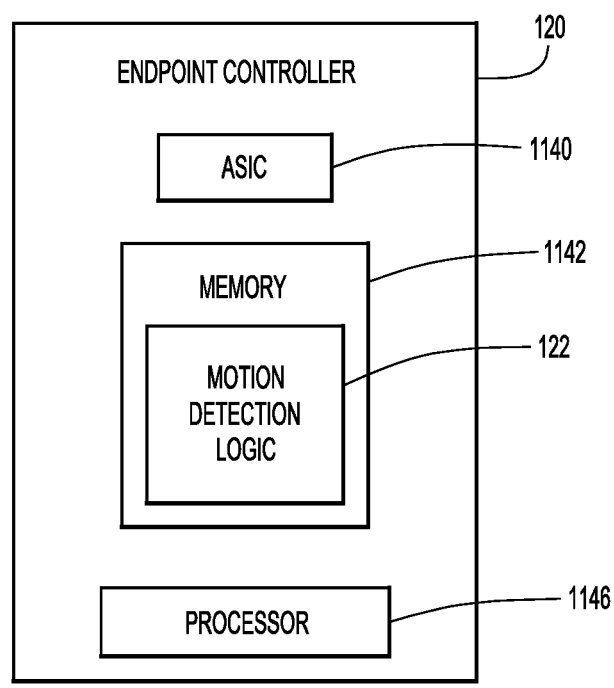
FIG. 11 is a block diagram of a collaboration endpoint controller configured to execute motion detecting techniques, according to an example embodiment.

FIG. 11 is a block diagram of endpoint controller 120, which is configured to execute the operations described herein. In this example, the endpoint controller 120 includes one or more application-specific integrated circuits (ASICs) 1140, a memory 1142, which stores or is encoded with instructions for the motion detection logic 122, and one or more processors 1146. The one or more ASICs 1140 may be customized for one or more particular uses (e.g., audio/video signal processing). The one or more processors 1146 are configured to execute instructions stored in the memory 1142 (e.g., motion detection logic 122). When executed by the one or more processors 1146, the motion detection logic 122 enables the endpoint controller 120 to perform the operations described herein in connection with FIGS. 1-10 and 12.

The memory 1142 may include read only memory (ROM), random access memory (RAM), magnetic disk storage media devices, optical storage media devices, flash memory devices, electrical, optical, or other physical/tangible memory storage devices. Thus, in general, the memory 1142 may include one or more tangible (non-transitory) computer readable storage media (e.g., a memory device) encoded with software comprising computer executable instructions and when the software is executed (by the processor 1146) it is operable to perform the operations described herein.

Figure 12:
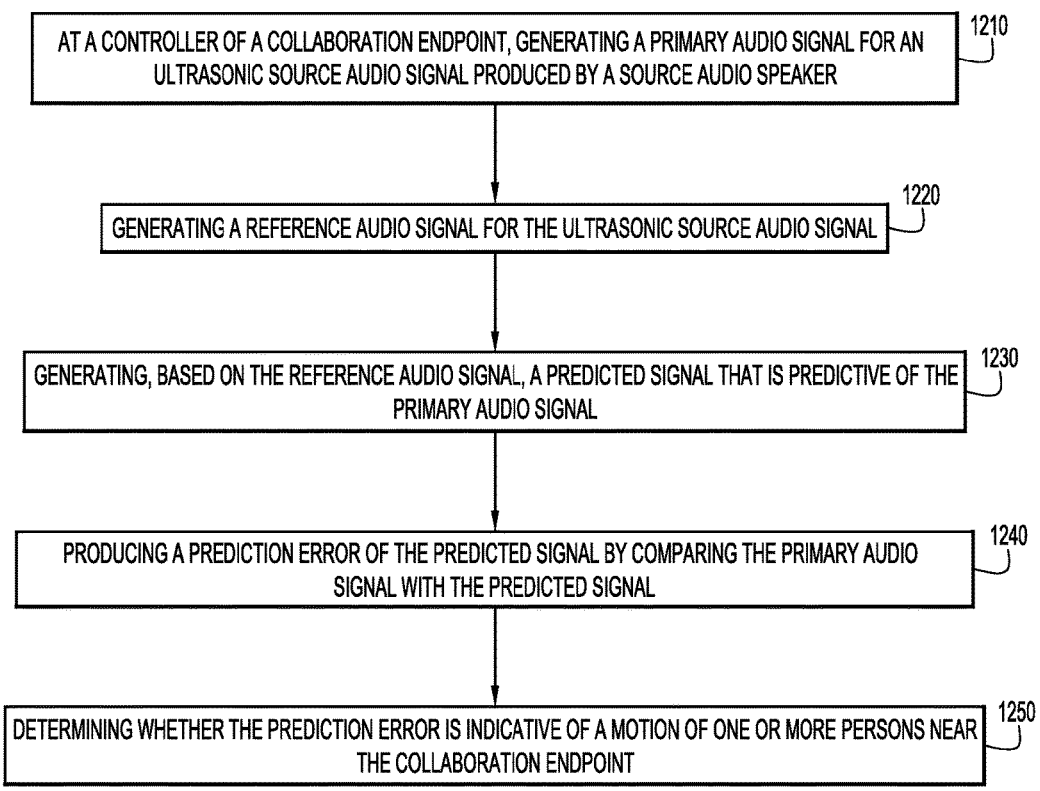
FIG. 12 is a flowchart of a generalized method in accordance with examples presented herein.

FIG. 12 is a flowchart depicting a generalized method 1200 in accordance with examples presented herein. At 1210, an endpoint controller of a collaboration endpoint generates a primary audio signal for an ultrasonic source audio signal produced by a source audio speaker. At 1220, the endpoint controller generates a reference audio signal for the ultrasonic source audio signal. At 1230, the endpoint controller generates, based on the reference audio signal, a predicted signal that is predictive of the primary audio signal. At 1240, the endpoint controller produces a prediction error of the predicted signal by comparing the primary audio signal with the predicted signal. At 1250, the endpoint controller determines whether the prediction error is indicative of a motion of one or more persons near the collaboration endpoint.

Using the techniques presented herein, collaboration endpoints may accurately detect motion in a conference room in which the endpoint is located. Upon detecting motion, a collaboration endpoint may enter active mode and, for example, display a friendly and informative greeting to the user. Endpoint motion detection may also be used to trigger burglar alarms, control lights/blinds, record and/or analyze the usage of the conference room, provide up-to-date information regarding the usage of the conference room, etc.

These techniques are power efficient because the endpoint may constantly monitor for motion while in standby mode. Moreover, these techniques may be deployed on existing and/or future (to be developed) endpoints. In addition, extra/additional hardware may not be required, thereby minimizing cost and complexity. Further, impulse responses may be non-linear and/or time-variant due to, for example, systems having poor quality amplifier cards, or when an ultrasonic pairing signal is played through a television with poor quality amplifiers and/or speakers.

The techniques described herein may also be desirable in situations involving multiple collaboration endpoints in the same room that each produce ultrasonic pairing signals. This is often the case in office spaces and classrooms where each user has a personal endpoint in the same room. These techniques may also be compatible with ultrasonic noise from other equipment, such as third party motion detectors in the ceiling. In addition, they are operable in large rooms that are not properly covered with an optimal number of microphones.

The number of signals used for motion detection by the endpoint is at least one more than the number of audio source signals. Thus, since one signal is used as the primary signal, the number of reference audio signals is equal to at least the number of audio source signals. In addition, it may be desirable to locate microphones far from speakers. In an example, microphones may be located throughout a conference room so as to provide accurate motion detection coverage for the entire room.

In one form, a method is provided. The method comprises: at a controller of a collaboration endpoint, generating a primary audio signal for an ultrasonic source audio signal produced by a source audio speaker; generating a reference audio signal for the ultrasonic source audio signal; generating, based on the reference audio signal, a predicted signal that is predictive of the primary audio signal; producing a prediction error of the predicted signal by comparing the primary audio signal with the predicted signal; and determining whether the prediction error is indicative of motion of one or more persons near the collaboration endpoint.

In another form, an apparatus is provided. The apparatus comprises: a source audio speaker; at least one microphone of a collaboration endpoint; and one or more processors coupled to a memory, wherein the one or more processors are configured to: generate a primary audio signal for an ultrasonic source audio signal produced by the source audio speaker; generate a reference audio signal for the ultrasonic source audio signal; generate, based on the reference audio signal, a predicted signal that is predictive of the primary audio signal; produce a prediction error of the predicted signal by comparing the primary audio signal with the predicted signal; and determine whether the prediction error is indicative of a motion of one or more persons near the collaboration endpoint.

In another form, one or more non-transitory computer readable storage media are provided. The non-transitory computer readable storage media are encoded with instructions that, when executed by a processor of a collaboration endpoint, cause the processor to: generate a primary audio signal for an ultrasonic source audio signal produced by a source audio speaker; generate a reference audio signal for the ultrasonic source audio signal; generate, based on the reference audio signal, a predicted signal that is predictive of the primary audio signal; produce a prediction error of the predicted signal by comparing the primary audio signal with the predicted signal; and determine whether the prediction error is indicative of a motion of one or more persons near the collaboration endpoint.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a controller of a collaboration endpoint, generating a primary audio signal for an ultrasonic source audio signal produced by a source audio speaker;
generating a reference audio signal for the ultrasonic source audio signal;
generating, based on the reference audio signal, a predicted signal that is predictive of the primary audio signal;
producing a prediction error of the predicted signal by comparing the primary audio signal with the predicted signal; and
determining whether the prediction error is indicative of a motion of one or more persons near the collaboration endpoint.

2. The method of claim 1, wherein the primary audio signal is produced by a microphone of a plurality of microphones of the collaboration endpoint.

3. The method of claim 1, wherein the reference audio signal is produced by a microphone of a plurality of microphones of the collaboration endpoint.

4. The method of claim 1, further comprising delaying the primary audio signal by a time delay equal to at least an amount of time between generating the primary audio signal and generating the reference audio signal.

5. The method of claim 1, further comprising adaptively filtering the reference audio signal.

6. The method of claim 1, further comprising separating the primary audio signal and the reference audio signal into sub-bands.

7. The method of claim 1, further comprising generating the primary audio signal, generating the reference audio signal, generating the predicted signal, and producing the prediction error in a time-frequency domain.

8. The method of claim 1, further comprising interpreting the prediction error as being indicative of the motion of the one or more persons near the collaboration endpoint such that a relatively large prediction error indicates the motion more strongly than a relatively small prediction error.

9. An apparatus comprising:
a source audio speaker;
at least one microphone of a collaboration endpoint; and
one or more processors coupled to a memory, wherein the one or more processors are configured to:
generate a primary audio signal for an ultrasonic source audio signal produced by the source audio speaker;
generate a reference audio signal for the ultrasonic source audio signal;
generate, based on the reference audio signal, a predicted signal that is predictive of the primary audio signal;
produce a prediction error of the predicted signal by comparing the primary audio signal with the predicted signal; and
determine whether the prediction error is indicative of a motion of one or more persons near the collaboration endpoint.

10. The apparatus of claim 9, wherein the primary audio signal is produced by a microphone of the at least one microphone of the collaboration endpoint.

11. The apparatus of claim 9, wherein the reference audio signal is produced by a microphone of the at least one microphone of the collaboration endpoint.

12. The apparatus of claim 9, wherein the one or more processors are further configured to delay the primary audio signal by a time delay equal to at least an amount of time between generating the primary audio signal and generating the reference audio signal.

13. The apparatus of claim 9, wherein the one or more processors are further configured to adaptively filter the reference audio signal.

14. The apparatus of claim 9, wherein the one or more processors are further configured to separate the primary audio signal and the reference audio signal into sub-bands.

15. The apparatus of claim 9, wherein the one or more processors are configured to generate the primary audio signal, generate the reference audio signal, generate the predicted signal, and produce the prediction error in a time-frequency domain.

16. The apparatus of claim 9, wherein the one or more processors are configured to interpret the prediction error as being indicative of the motion of the one or more persons near the collaboration endpoint such that a relatively large prediction error indicates the motion more strongly than a relatively small prediction error.

17. One or more non-transitory computer readable storage media encoded with instructions that, when executed by a processor of a collaboration endpoint, cause the processor to:
generate a primary audio signal for an ultrasonic source audio signal produced by a source audio speaker;
generate a reference audio signal for the ultrasonic source audio signal;
generate, based on the reference audio signal, a predicted signal that is predictive of the primary audio signal;
produce a prediction error of the predicted signal by comparing the primary audio signal with the predicted signal; and
determine whether the prediction error is indicative of a motion of one or more persons near the collaboration endpoint.

18. The non-transitory computer readable storage media of claim 17, wherein the primary audio signal is produced by a microphone of a plurality of microphones of the collaboration endpoint.

19. The non-transitory computer readable storage media of claim 17, wherein the reference audio signal is produced by a microphone of a plurality of microphones of the collaboration endpoint.

20. The non-transitory computer readable storage media of claim 17, wherein the instructions further cause the processor to delay the primary audio signal by a time delay equal to at least an amount of time between generating the primary audio signal and generating the reference audio signal.

* * * * *